M. MEEKS.
HOSE COUPLING.
APPLICATION FILED FEB. 13, 1914. RENEWED SEPT. 16, 1915.
1,157,997. Patented Oct. 26, 1915.
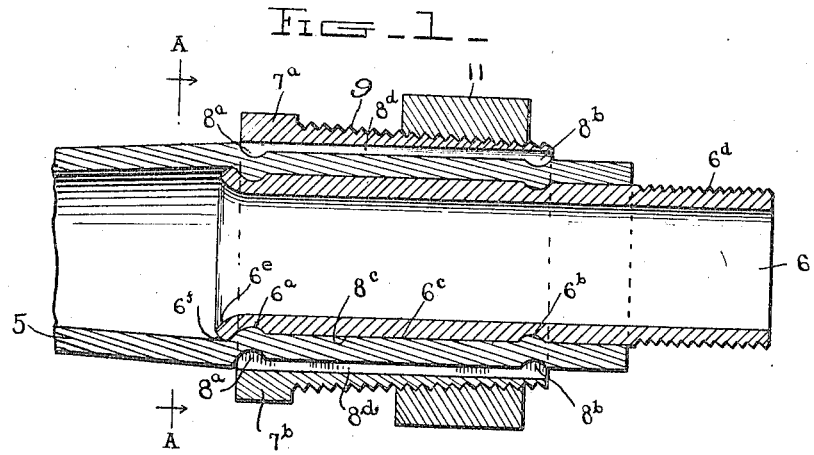
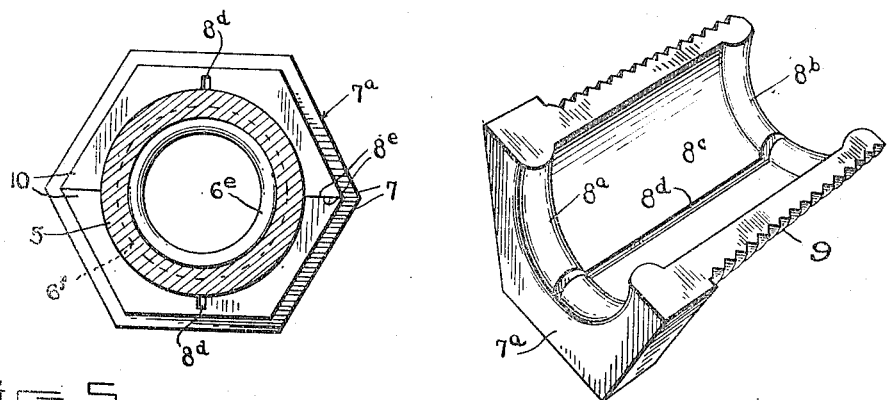
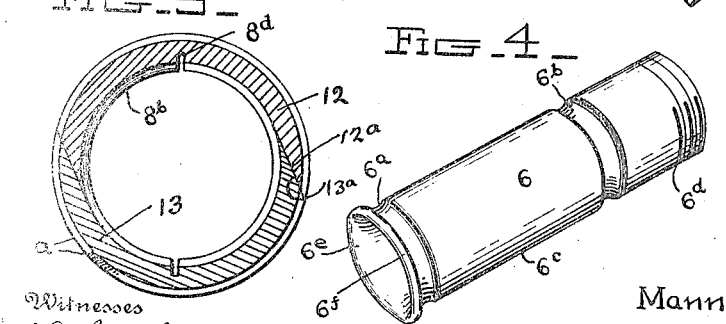
Inventor
Manning Meeks
By Joseph J. O'Brien
Attorney
Witnesses
L. Southworth
F. Wm. Ernst

UNITED STATES PATENT OFFICE.

MANNING MEEKS, OF CEDAR RAPIDS, IOWA.

HOSE-COUPLING.

1,157,997.          Specification of Letters Patent.     Patented Oct. 26, 1915.

Application filed February 13, 1914, Serial No. 818,603.  Renewed September 16, 1915.  Serial No. 51,090.

*To all whom it may concern:*

Be it known that MANNING MEEKS, a citizen of the United States, residing at Cedar Rapids, in the county of Linn and State of Iowa, has invented certain new and useful Improvements in Hose-Couplings, of which the following is a specification.

This invention relates to improvements in hose couplers and its leading object is to provide a hose coupler capable of being quickly applied and adapted to efficiently couple hose employed in connection with the use of high pressure gas and fluids.

The invention is embodied in a simple construction, which embraces a nipple having one or more circumscribing grooves into which the material of the hose is compressed, a clamping sleeve formed in two companion sections substantially like each other and provided with ribs adapted to force the hose material into the nipple groove or grooves, as the case may be, and so formed that a uniform four-point closing action and pressure is obtained, and a nut threadable on the sleeve, which has a conical external thread and adapted to close the sleeve around the hose to compress the hose material into the nipple groove or grooves, and to thereby complete the seal and to lock the sleeve and the hose to the nipple against relative longitudinal movement.

With the above and other objects in view, the invention comprises certain novel and useful constructions of parts, combinations and functions resulting from the combinations, clearly described in the following specification and fully illustrated in the accompanying drawings, in which:—

Figure 1 is a longitudinal sectional view through the coupler, applied to the end of one of the nipples. Fig. 2 is a transverse sectional view taken on line A—A of Fig. 1, looking in the direction of the arrows. Fig. 3 is a detail perspective view of one of the sections of the clamping sleeve. Fig. 4 is a detail perspective view of one of the nipples, the other being a duplicate thereof. Fig. 5 is a detail sectional view of a modified form of the clamping sleeve.

Referring to the accompanying drawings, which are intended to illustrate one application of the invention, and which are not intended to define the proportions and only relations of the parts shown, 5 designates a section of hose, which is composed of a combination of rubber and canvas, armored or unarmored, as experience may advise, and 6 designates one of the nipples, the other not being shown.

The nipple 6 is provided with a cylindrical outer surface and is formed with two circumscribing grooves $6^a$ and $6^b$, which are spaced longitudinally from each other, to provide the relatively uniform cylindrical surface $6^c$ therebetween. External screw threads $6^d$ are formed on one end portion of the nipple 6, and the opposite end is slightly flared at $6^e$ and is beveled at $6^f$, to form a non-cutting hose engaging surface, which is adapted to slidably fit within the hose 5. The grooves $6^a$ and $6^b$ may be formed by grinding or by other means, and the groove $6^a$ is located adjacent the flare $6^e$, so that said flare coöperates with said groove to complete the seal and to lock the nipple to the hose and the clamping sleeve, designated by the reference numeral 7.

The clamping sleeve 7 is formed in two companion sections, $7^a$ and $7^b$, each section having a transverse locking projection or rib $8^a$, located near one end and a second transverse locking rib $8^b$, located at the other end. The locking ribs $8^a$ and $8^b$ are substantially semicircular in cross section and project inwardly to register with the circumscribing grooves $6^a$ and $6^b$ and force the material of the hose into said grooves. A relatively smooth, cylindrical surface $8^c$ is provided between the locking ribs $8^a$ and $8^b$. It is understood, however, that the surfaces $6^c$ and $8^c$ may be slightly roughened to increase the frictional engagement of the hose and the clamping sleeve.

Each section of the clamping sleeve 7 is formed with a medially located longitudinally extending groove $8^d$, which has a depth sufficient to leave a relatively thin portion which holds the halves of each sleeve section, constituting quarters of the complete sleeve, united to each other. The grooves $8^d$ extend through the locking ribs $8^a$ and $8^b$.

The clamping sleeve 7 is formed with a conical external surface which is provided with a screw thread 9, and the larger end of the sleeve is provided with a hexagonal projection 10, adapted to be engaged by a wrench to hold the sleeve during the assembling or disassembling operation.

The companion sleeve sections $7^a$ and $7^b$ are substantially duplicates of each other and are provided, each with meeting faces 8ᵉ, which are adapted to contact with each other when the sections are assembled. The portions of the screw thread 9 on one section also being adapted to match with the portions of the screw thread on the other section.

A solid, non-split nut 11, having a bore tapered and threaded to correspond with the taper and thread of the sleeve 7, is threaded on the sleeve, and is adapted to hold the sections of the sleeve clamped around the hose and the nipple, and to effectively seal the hose on the nipple.

In applying the improved coupler the nipple 6 is grasped or held and the flared end thereof is forced into the hose 5. The sections 7ᵃ and 7ᵇ of the clamping sleeve 7 are then placed around the hose, with the locking ribs thereof in alinement with the grooves of the nipple. The companion sections of the clamping sleeve can then be forced into clamping engagement with the hose by slipping the nut 11 on the nipple 6 and threading said nut on the smaller end of the clamping sleeve. This threading action will draw the sections of the sleeve toward each other and will force the material of the hose lying between the locking ribs and the nipple grooves into said grooves, thereby effectively locking the clamping sleeve to the nipple against relative longitudinal movement thereon and efficiently sealing the connection between the hose and the clamping sleeve. The flare 6ᵉ of the nipple, by slightly expanding the material of the hose outward of the locking rib coöperating with the groove 6ᵃ, coöperates with said groove to seal the connection between the sleeve and the hose and to lock the sleeve to the hose and the nipple 6. As the grooves 6ᵃ and 6ᵇ of the nipple are approximately equal in depth to one-half, or thereabouts, of the thickness of the wall of the hose, and the locking ribs 8ᵃ and 8ᵇ are adapted to positively deflect the material of the hose into the grooves 6ᵃ and 6ᵇ, and to hold said material compressed in said grooves, under the positive clamping action of the solid nut 11, a positive longitudinal lock between the sleeve and the hose and the nipple is provided, which is of such a nature that the hose cannot be pulled from between the sleeve and nipple, as by the skinning of the outer coat of the hose.

By reason of the longitudinal grooves 8ᵈ in the sections of the clamping sleeve said sections are caused to close in such a manner that a substantially uniform four-point pressure is exerted on the hose and the nipple. This prevents an uneven compression of the hose on the nipple, and a positive and dependable seal. When the sleeve is closed very tightly around a hose on the nipple the side walls of the grooves 8ᵈ may actually contact with other, due to the contraction of the sections of the sleeve, and the halves of each section under the drawing action of the nut 11. When the nut is unthreaded the halves of each section will naturally resume their original relations, due to the resiliency of the material of which the sections are composed and to the bridge portions connecting the halves of each sleeve section.

The improved coupler is exceedingly simple in construction, easy to operate, and can be cheaply manufactured. It is understood that I am entitled to use any changes in the construction of the parts of the coupler, in their proportions and combinations, as will come within the scope of the invention defined in the following claim.

In Fig. 5 I have illustrated a modified form of the clamping sleeve, wherein I show beveled meeting faces 12ᵃ and 13ᵃ on the sections 12 and 13 of the clamping sleeve. By this arrangement the cost of production of the sleeve may be materially reduced and the action of the sleeve under the closing pressure of the nut will be materially improved. The beveled meeting faces provide lap joints, which in turn provide a sliding contact between the sections of the sleeve and allow for the maximum of compression of the sleeve under the action of the nut. The compressing action of the sleeve sections will not be limited to the point of actual contact between the meeting faces of the sleeve sections, but will continue until the nut has reached its limit of travel.

Having described my invention I claim:—

In combination, a nipple consisting of a pipe of substantially uniform diameter formed with circumscribing grooves cut therein, a part of said grooves being located near the end of said nipple to be inserted in the hose and a part being spaced therefrom to provide a cylindrical bearing surface, the end of the nipple for insertion in the hose being flared larger than the body of the nipple, a sleeve comprising two sections of equal size mountable on the hose over the nipple, each of said sleeve sections having diagonal longitudinally extending meeting faces and transverse internal ribs adapted to register with the grooves of the nipple and to force the material of the hose therein, each sleeve section having a medial longitudinally extending internal groove of substantially uniform depth from one end to the other and extending from one end of the nipple to the opposite end, whereby the sleeve sections will yield concentrically around the hose to effect a uniform compression thereof, said sleeve having a tapered external thread, and a nut threaded on the sleeve, the sleeve sections being adapted to slide on each other to increase the force of compression and the flared end of the nipple serving to spread the material of the hose around the adjacent end of the sleeve to seal the joint therewith, the hose being interlocked with the nipple and sleeve by the internal ribs of the sleeve and the grooves of the nipple.

In testimony thereof I affix my signature in presence of two witnesses.

MANNING MEEKS.

Witnesses:
L. SOUTHWORTH,
L. JORDAN.